United States Patent Office 3,694,154
Patented Sept. 26, 1972

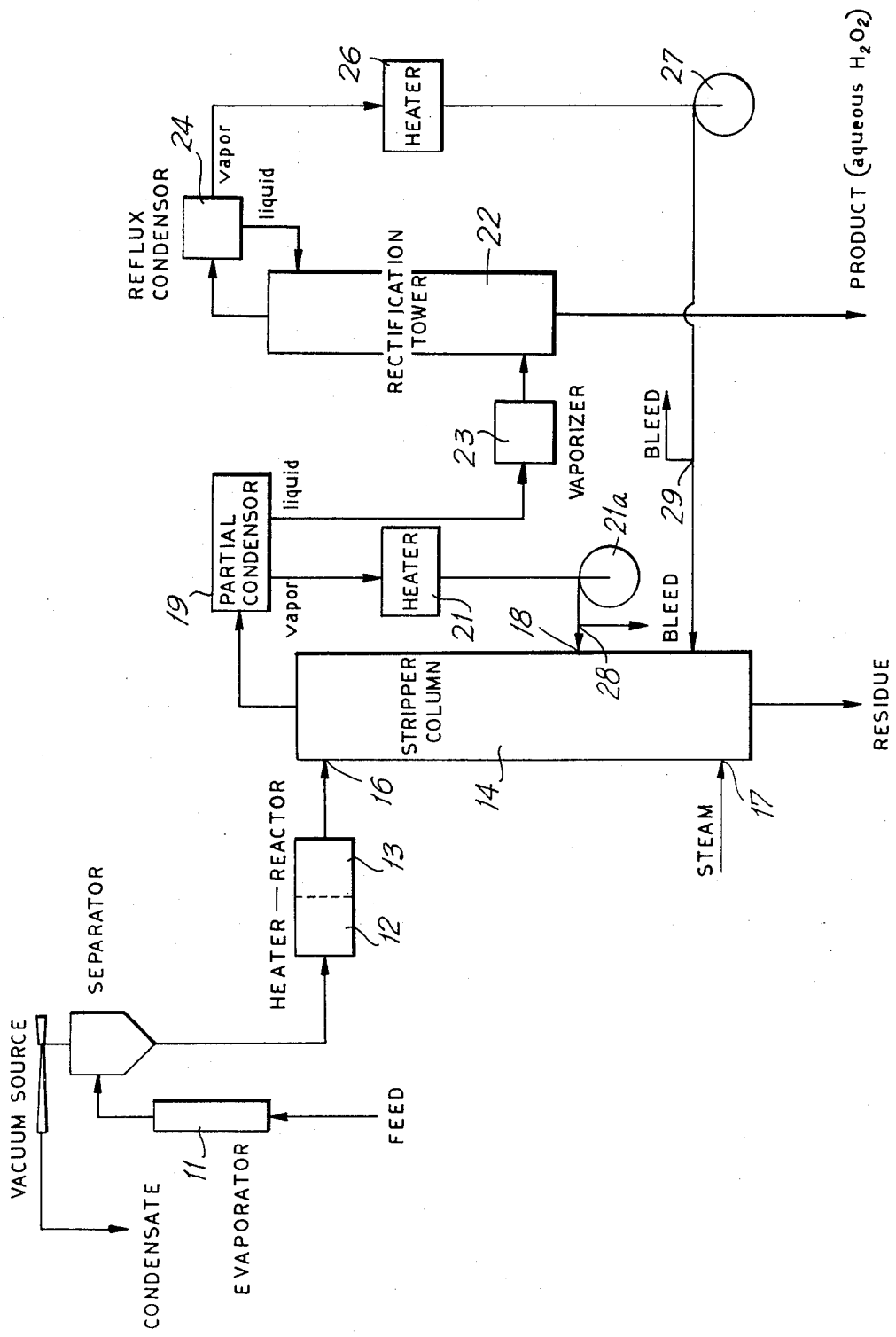

3,694,154
PRODUCTION OF HYDROGEN PEROXIDE FROM AQUEOUS ACIDIC SOLUTION OBTAINED BY HYDROLYSIS
William Sheridan Harper, Williamsville, and David Wayne Daigler, East Aurora, N.Y., assignors to FMC Corporation, New York, N.Y.
Filed Jan. 23, 1968, Ser. No. 699,958
Int. Cl. C01b 15/02; B01d 3/38, 1/00
U.S. Cl. 423—585
5 Claims

ABSTRACT OF THE DISCLOSURE

Process for making $H_2O_2$ from the solution obtained by electrolysis of an aqueous ammonium sulfate-sulfuric acid mixture. After an initial step of partial concentration under vacuum, the solution is then treated at about atmospheric pressure (or higher), using successive steps of heat treating to effect hydrolysis, steam stripping, partial condensation to form a liquid enriched in $H_2O_2$, and rectification, to produce about 35% $H_2O_2$.

The production of hydrogen peroxide from an acidic aqueous solution containing persulfate radical is well known to the art. Typical processes of this kind (in which the persulfate radical is generally produced by electrolysis of a solution containing sulfate radical) are described in the book "Hydrogen Peroxide" by Schumb, Satterfield and Wentwood (Reinhold Publishers, 1955) at pages 123–153. The patent literature also describes a wide variety of processes of this type.

In an especially useful process an aqueous solution of ammonium persulfate and sulfuric acid is electrolyzed to produce persulfate radicals therein and the solution is then distilled under vacuum to convert the persulfate to hydrogen peroxide and drive off aqueous hydrogen peroxide. One such process, disclosed for example, in the U.S. patent to Harrower et al. 2,282,184, is operated at pressures of less than 1/6 atmosphere (for example below about 1/12 atmosphere) in two stages; in the first stage the electrolyzed solution is concentrated under the vacuum to remove some 40% of its weight of water (which greatly increases the acidity of the remaining liquor) without substantial removal of $H_2O_2$ while in the second stage the concentrated solution is delivered to a steam stripper column, likewise operated under the same vacuum, from the top of which an $H_2O_2$-$H_2O$ mixture of low $H_2O_2$ content is taken. A method of this type is also described in the Schumb et al. book at p. 130. It has been the general understanding in the art that a high degree of acidity is very desirable for the production of hydrogen peroxide; this is explained more explicitly in the U.S. patent to Adolph et al. 2,278,605.

In accordance with one aspect of this invention there has been developed a novel process for the production of hydrogen peroxide from the aqueous acidic persulfate solution produced by the electrolysis. The invention makes it possible to operate for most of the process at atmospheric pressure, without using vacuum. By the use of the novel process of the invention the volume of vapors can be reduced (thus reducing the size of the equipment and the cost thereof), the loss of oxygen from the system can be decreased and the efficiency raised, and the danger of possible precipitation of salts on portions of the equipment such as packing and separators can be reduced.

The drawing is a schematic flow diagram of one preferred embodiment of the invention.

In the embodiment illustrated in the drawing there may be employed as the feed material a solution of well known type obtained on electrolysis of a liquid mixture of dissolved ammonium sulfate, sulfuric acid and water. The amount of ammonium sulfate in the solution before electrolysis may be, for instance, in the range of about 0.4 to 1.3 parts by weight per part of sulfuric acid and the amount of water is sufficient to dissolve these ingredients and is generally above about 50%. Most preferably the amount of water is below about 75%. The electrolysis converts sulfate and sulfuric acid, at least in part, to peroxydisulfate and peroxydisulfuric acid to give a solution containing in the range of about ½ to 2½% of active oxygen. Thus the composition of the electrolyzed solution can be expressed as containing at least about 50% of water (e.g. about 55 to 70% water), about 0.4 to 1.3 parts by weight of equivalent ammonium sulfate per part by weight of equivalent sulfuric acid, and about ½ to 2½% of active oxygen (which is present substantially entirely in persulfate form).

According to one aspect of this invention, the electrolyzed solution is treated to concentrate it to only a limited extent, to a stage where it still contains at least about 30% water and its acidity (expressed as total equivalent $H_2SO_4$) is at most about 45%. It will be seen that the water content is considerably higher and the acidity is considerably less than that of the product obtained by conventional concentrating procedures. More particularly, in the preferred procedure the electrolyzed solution is treated by removing part of its water content by evaporation, without removing any substantial amount of hydrogen peroxide, any amount of active oxygen lost in this step being negligible (less than 1% of the total active oxygen). Such removal of water is conveniently effected by subjecting the solution to subatmospheric pressure (as in an evaporator 11) until its water content is about 25–45%, preferably to give a solution whose composition is in the following range:

total equivalent $H_2SO_4$: about 30–45%
total equivalent $(NH_4)_2SO_4$: about 20–35%
active oxygen: about 0.7–2.5% with at least about 70%, and preferably about 80% or more, of the active oxygen being present in persulfate radicals (i.e. as $S_2O_8^=$ or $SO_5^=$).

Suitably the concentration step is effected at a pressure in the range of about 0 to 200 mm. Hg absolute, preferably in the range of about 30 to 120 mm. Hg at a temperature in the range of about 50 to 85° C., preferably in the range of about 55 to 75° C. Temperatures and pressures within the lower portions of the above ranges are most preferred in order to keep the loss of hydrogen peroxide at this stage to a minimum. However, from a practical standpoint to reduce cost of vacuum equipment and sizes of the vapor lines, a temperature and pressure as high as possible consistent with low conversion to $H_2O_2$ is desired. This can be accomplished by adjusting flow rates through the apparatus so that there is a shorter residence time when operating at the higher temperature. The residence time will normally fall in the range from a fraction of a second to 200 seconds, e.g. about 10 seconds. During the concentration step substantial hydrolysis of $S_2O_8^=$ to $SO_5^=$ occurs. Too high a temperature (pressure) or a long residence time in the evaporation unit will cause the $SO_5^=$ to further hydrolyze to $H_2O_2$ and $SO_4^=$. For best results the water is evaporated, in the concentration step, until there is produced a solution which has an atmospheric boiling point in the range of about 105–130° C. Preferably there is formed a solution which on hydrolysis of 90% of its peroxydisulfate and peroxymonosulfate radical to hydrogen peroxide yields a vapor phase containing about 2% $H_2O_2$ when the hydrolyzed solution is subjected to live steam at atmospheric pressure.

In the preferred embodiment of the process, after the concentration step the partially concentrated solution is heated to at least about its atmospheric boiling point and maintained in such heated condition, at at least about atmospheric pressure in order to convert most of the $S_2O_8^=$ and $SO_5^=$ into $H_2O_2$.

Most conveniently the heat treatment is carried out at about the boiling temperature of the solution (e.g. about 105–130° C.) at about atmospheric pressure. At the temperatures used, which are generally below 150° C., the partial pressures of hydrogen peroxide formed in the solution are considerably below the prevailing pressure, and the $H_2O_2$ is retained in the solution. During this heating period it is preferred that the water content of the solution be maintained in the range of about 25–45%; in a particularly preferred embodiment substantially no water is removed from the system by evaporation during this heating period. It is our view that removal of water tends to drive the reaction in the opposite direction, toward the reformation of $SO_5^=$. For best results the residence time of the solution under the conditions of this heat treatment should be sufficient to convert to $H_2O_2$ at least 85% of the per-oxygen originally present in persulfate radicals (e.g. $SO_5^=$ and $S_2O_8^=$) in the solution. Generally the length of this period will depend on the temperature and concentration of the solution. Residence times above about two minutes, e.g. about 5 to 15 minutes, give very good results. As indicated in the drawing, the heat treatment may be effected in a heater 12 and the hot solution may be maintained at the elevated temperature in a reactor 13 which may constitute part of the heater. No superatmospheric pressure is needed in the heat treatment stage. Thus the mixture may be at the boil at atmospheric pressure or may be at a small superatmospheric pressure, preferably less than 2 atmospheres gauge, most preferably less than 1 atmosphere gauge.

In the preferred embodiment the heat-treated solution is then treated counter-current with steam to strip the hydrogen peroxide from the solution. This is conveniently effected in a packed column 14 (or other fractional distillation column, such as a multiple tray column) at atmospheric pressure, as by feeding the heat-treated solution into the column at one point 16 (usually at or near the top of the column) and feeding live steam into the column at a lower point 17 (usually at or near the bottom of the column). In a preferred process, process vapors comprising a mixture of $H_2O$ and $H_2O_2$ are also recycled to the column 14, being fed into the column at a point 18 below the point of introduction of the heat treated solution and above the point of introduction of the live steam. The stripper column 14 is operated at temperature of at least about 100° C. and a pressure which is about atmospheric or, if desired, somewhat higher but preferably less than 2 atmospheres gauge, most preferably less than 1 atmosphere gauge. The steam for stripping can of course be generated internally in the column, by supplying liquid water, rather than steam, to the column and heating the water therein to form steam, as in a reboiler. Preferably about 60 to 130 pounds of steam are fed up column 14 per pound of active oxygen in the feed to the column. Superheated steam can be fed to column 14, or, if desired, the effect of the use of superheated steam may be attained by feeding saturated steam at relatively high pressures (e.g. up to 100 p.s.i.g.) to a stripping column operated at a considerably lower pressure than that of the feed steam.

From the top of the stripper column 14 there is removed a stream of vapors containing $H_2O$ and $H_2O_2$ (e.g. having an $H_2O_2$ concentration of about ½% to 2%). These vapors are preferably passed to a partial condenser 19 (operating, for example, at a temperature of about 100 to 130° C.) to produce a liquid relatively rich in $H_2O_2$ (e.g. having an $H_2O_2$ concentration of about 4 to 10%) and vapors relatively poor in $H_2O_2$ (e.g. having an $H_2O_2$ concentration of about 0.05 to 0.5%). The latter vapors are preferably recycled to the stripper column 14 (as previously indicated), desirably after a slight reheating at 21 to bring their temperature up to about the temperature of the stripper column at the level where they enter it and to prevent liquid erosion of the vapor pump (fan 21a) used for forcing them into the stripper column.

The $H_2O_2$-rich liquid from the partial condenser 19 is then distilled, preferably in a suitable fractional distillation column such as the rectification tower 22. In one convenient method of operation the liquid is converted to vapor by passing it through a vaporizer or boiler 23 and then fed into the lower portion of the rectification tower 22 which is equipped with a reflux condenser 24. A liquid aqueous $H_2O_2$ solution of about 35% concentration is recovered from the base of the tower 22 while steam (containing a small proportion of $H_2O_2$, less than 0.1%) is taken off overhead. The major portion of this overhead steam is preferably recycled to the stripper column 14 preferably after reheating the steam to a temperature of, say, about 115° C., as in heater 26; a vapor pump (fan 27) may be used to force the reheated vapors into column 14.

The partial condensation and rectification are preferably effected at about atmospheric pressure, but, if desired, they may be carried at a somewhat higher pressure, but preferably less than 2 atmospheres gauge, most preferably less than 1 atmosphere gauge.

The water concentration in the heat-treated solution fed to the top of the stripper column 14 is relatively high, since the solution has been only partially concentrated (as previously explained). The solution therefore has a relatively low boiling point at atmospheric pressure so that it can be readily stripped by using steam at atmospheric, or higher, pressure without the need for employing vacuum. By the use of the partial condenser 19 the relatively lean vapors from the stripper column 14 are made to yield a greatly enriched solution which can be rectified in a single tower 22 of reasonable size.

In the partial condenser a portion of the vapors is condensed by the cooling action of a cooled solid surface. In the embodiment shown in the drawing the only material supplied to the partial condenser is the vapor from the stripping column. On effective contact of this vapor with the solid cooling surface in the partial condenser, there is formed a film of cooled liquid running down the cooling surface; this cooled film, which is in contact with the incoming vapors, serves to remove heat from these vapors and effect the partial condensation. Preferably, no significant cooling by contact with any other streams of material occurs in the partial condenser. Typically the partial condenser will have one or more vertical cooled plates or tubes in the path of the vapors passing through the condenser.

In the operation of the stripper column 14 and rectification tower 22 there is a pressure drop from the base to the top in each case. Generally this is below about 5 p.s.i.g. (e.g. about ¾ to 1 p.s.i.g.). There may also be a small pressure drop across the partial condenser.

It will be understood that the descriptions of the compositions of the solutions are given herein in conventional terms, and these compositions may be determined by well known analytical techniques. Thus, a typical electrolyzed solution fed to the concentration step contains hydrogen ions, ammonium ions, sulfate ions, peroxymonosulfate ions ($SO_5^=$) and peroxydisulfate ions ($S_2O_8^=$), the active oxygen being present in said persulfate ions rather than as hydrogen peroxide per se. In analyzing this solution (and other solutions obtained at later stages of the process of this invention) the method described by L. J. Csanyi and F. Solymosi, Z. Anal. Chem. 142, 423 (1954) may be employed for determining the amounts of $H_2O_2$ (as such), $SO_5^=$ and $S_2O_8^=$.

Analysis for hydrogen ion content (total acidity) and ammonium ion content may be effected in well known conventional manner. Thus total acidity may be determined by first boiling the sample with alcohol to drive off active oxygen and then titrating the resulting material with aqueous NaOH. Ammonium salt content may be determined by adding formaldehyde to the sample and allowing the mixture to stand to destroy the ammonium ion (as by combination thereof with formaldehyde), followed by titration with aqueous NaOH, and comparison of the acidity thus determined with the "total acidity" determined as described above. The sulfate ion concentration then may be calculated from the difference between the measured numbers of equivalents of the positive ions ($H^+$, $NH_4^+$) and the negative ions ($SO_5^=$, $S_2O_8^=$).

From the data and calculations discussed above the solution composition can be given in terms of percentages of $H_2SO_4$, $H_2SO_5$, $(NH_4)_2SO_4$, $(NH_4)_2S_2O_8$ and $H_2O_2$. The water content is the balance. This, however, is merely one convenient and well known way of describing the composition of the solution. The composition may also be set forth in other well known terms, as by reference to the equivalent percentages of $(NH_4)_2SO_4$, $H_2SO_4$ and active (peroxidic) oxygen. The latter equivalent percentages may, if desired, be calculated from the more detailed percentages previously mentioned. In making such calculations, the amounts of $H_2SO_4$ and of $(NH_4)_2SO_4$ are taken as the amounts stated for these ingredients plus the amounts which would be formed on hydrolysis of the stated amounts of $H_2SO_5$ and $(NH_4)_2S_2O_8$; that is, one mol of $H_2SO_4$ is formed per mol of $H_2SO_5$, and one mol of $H_2SO_4$ and one mole of $(NH_4)_2SO_4$ are formed per mol of $(NH_4)_2S_2O_8$. The amount of active oxygen is one atom per mol of $H_2SO_5$ and one atom per mol of $(NH_4)_2S_2O_8$.

The following example is given to illustrate this invention further. The example illustrates a continuous steady-state process. It is within the scope of the invention to use continuous unsteady-state (e.g. pulsating) processes in the same way or to use batch processing techniques.

In this application all proportions are by weight unless otherwise indicated.

EXAMPLE

In this example the feed material is a solution obtained by electrolysis of an aqueous solution of ammonium sulfate and sulfuric acid. As is conventional, the composition of this electrolyzed solution (and of the solutions formed in the process of this invention) may be expressed in terms of percentages of $H_2O$, $H_2SO_5$, $(NH_4)_2S_2O_8$, $H_2SO_4$ and $(NH_4)_2SO_4$. In those terms the feed solution contains 55.35% $H_2O$, 1.60% $H_2SO_5$, 14.25% $(NH_4)_2S_2O_8$, 19.70% $H_2SO_4$ and 9.10% $(NH_4)_2SO_4$. In terms of equivalent percentages of $(NH_4)_2SO_4$, $H_2SO_4$ and active oxygen, the same feed solution contains 27.2% equivalent $H_2SO_4$, 17.35% equivalent $(NH_4)_2SO_4$ and 1.2% active oxygen.

A continuous stream of the solution is concentrated in the evaporator 11 at a pressure of about 150 mm. Hg absolute and a temperature of about 87° C. to remove about 31.5% of its weight as water, overhead, giving a liquid concentrate containing about 34.3% $H_2O$ and about ½% $H_2O_2$; further details of its analysis are about 8.8% $H_2SO_5$, about 3.2% $(NH_4)_2S_2O_8$, about 30% $H_2SO_4$ and about 22.7% $(NH_4)_2SO_4$.

A continuous stream of the concentrate (still at about 78° C.) is fed to the heater-reactor 12, 13 which is at an atmospheric pressure and a temperature of about 125° C. to produce a liquid mixture containing about 3.4% $H_2O_2$. Substantially no evaporation occurs in the heater-reactor; the analysis of the product of this step is, for instance, about 1.1% $H_2SO_5$, about 38.2% $H_2SO_4$, about 25.1% $(NH_4)_2SO_4$, no $(NH_4)_2S_2O_8$ and the balance water and the $H_2O_2$.

A continuous stream of the heat-treated concentrate is then fed, without substantial intermediate heating or cooling, to the upper portion of the stripper column 14. This column is supplied with saturated fresh and recycled steam which is fed into its base at a pressure of about one p.s.i.g. at a rate of about 66.5 pounds of steam per 100 pounds of concentrate. A stream of vapors, containing a small amount of $H_2O_2$ (e.g. about 0.4% $H_2O_2$) and the balance $H_2O$, is also continuously recycled to the stripper column from the partial condenser 19 at a rate of about 15 pounds per 100 pounds of concentrate. Heat is supplied to the column by the steam (including recycled vapors). A stream containing about 2% $H_2O_2$ and 98% water is taken off from the top of the stripper column, while an aqueous solution substantially free of $H_2O_2$ and of other forms of active oxygen (i.e. substantially free of peroxymonosulfate or peroxydisulfate radicals) is withdrawn from its base. This solution, containing ammonium sulfate and sulfuric acid, may be recycled to the electrolysis step, preferably after dilution with water.

A continuous stream of the overhead vapors from the stripper column (at a temperature above 100° C., e.g. 105° C.) is fed to the partial condenser 19, operated at atmospheric pressure, where about one third of the weight of these vapors is condensed giving a condensate containing about 5–6% (e.g. 5.3%) of $H_2O_2$ and the balance water. This condensate is fed continuously through the boiler 23 where it is vaporized at atmospheric pressure and the resulting vapors are then fed to the base of the rectification tower 22. This base of this tower is at a pressure of minus ½ p.s.i.g. while its reflux condenser 24 is at minus 1½ p.s.i.g. A continuous stream of an aqueous solution of hydrogen peroxide of about 35% concentration is taken from the base of the tower.

The vapors taken from the top of the tower 22 are substantially entirely water; they are passed through a heater 26 where their temperature is raised to substantially the saturation temperature corresponding to the pressure at the base of stripper column 14 and are forced by the fan 27 into the base of the stripper column.

To prevent non-condensible gases from building up in the system small portions of the vapor streams returning to the stripper column are bled off at points 28 and 29.

While this invention finds its greatest utility in the manufacture of hydrogen peroxide from persulfate solutions in which the cations are only hydrogen and ammonium it is within the broader scope of the invention to employ solutions which contain other cations as well. Thus, in place of a minor part of the ammonium ion there may be present a small amount of potassium ion (the potassium salts being much less soluble than the corresponding ammonium salts) or a larger amount of sodium ion (to provide, for example, a solution in which the amount of sodium is about equal to the amount of ammonium ion).

It has been stated herein that the aqueous solution consists of dissolved persulfate, sulfate and ammonium radicals and hydrogen ion. It will be understood that these components may be present, in part or wholly, in associated form, e.g. as bisulfate and bipersulfate radicals or as undissociated salts.

We claim:

1. Process for the production of hydrogen peroxide which comprises supplying an acidic aqueous feed solution consisting essentially of persulfate, sulfate and ammonium radicals, hydrogen ion and water, the amount of water being in the range of about 25–45%, heat treating said solution at a temperature at least as high as its atmospheric pressure boiling point, said heat treatment being effected while maintaining the water content of the solution in said range of about 25–45%, and steam stripping the resulting solution at a temperature of at least about 100° C. and a pressure at least about atmospheric and less than two atmospheres gauge to produce vapors containing water and hydrogen peroxide, said process including the step of partially condensing a portion of the vapors by the cooling effect of a cooled solid surface to produce a liquid having a higher hydrogen peroxide content than said vapors and then rectifying the condensate from said partial condensation to produce a residual liquid having a still higher hydrogen peroxide content.

2. Process as in claim 1 in which during said partial condensation said vapors are in contact with a flowing film of condensate of said vapors on said cooled solid surface.

3. Process as in claim 2 in which said steam stripping, partial condensation and rectification are effected at substantially atmospheric pressure.

4. Process as in claim 1 in which the steam stripping is effected in a column to the upper part of which said heat treated solution is fed while steam is supplied to the lower portion of said column, and the vapors taken from the top of said column contain about ½ to 2% $H_2O_2$, the process also comprising partially condensing said vapors to produce a liquid containing about 4 to 10% $H_2O_2$ and uncondensed vapors, and returning said uncondensed vapors to said column at a point below the point of introduction of said heat treated solution.

5. Process which comprises feeding a solution consisting essentially of $H_2O_2$, sulfate and ammonium radicals, hydrogen ion and about 25–45% water, to an upper portion of a steam-stripping column operating at a temperature of at least about 100° C. and a pressure at least about atmospheric pressure and less than two atmospheres gauge, while supplying steam to a lower portion of said column to produce vapors containing water and hydrogen peroxide and partially condensing said vapors by the cooling effect of a cooled solid surface to produce a liquid containing a higher hydrogen peroxide content than said vapors.

References Cited

UNITED STATES PATENTS

| | | | |
|---|---|---|---|
| 2,067,364 | 1/1937 | Weber et al. | 23—207 |
| 2,282,184 | 5/1942 | Harrower et al. | 23—207 |

OSCAR R. VERTIZ, Primary Examiner

H. S. MILLER, Assistant Examiner

U.S. Cl. X.R.

203—96; 204—84